US011376494B2

(12) United States Patent
Schoenith et al.

(10) Patent No.: US 11,376,494 B2
(45) Date of Patent: Jul. 5, 2022

(54) APPARATUS AND METHOD FOR CONTROLLER ACCESSORY

(71) Applicant: INCIPIO, LLC, Irvine, CA (US)

(72) Inventors: John M. Schoenith, Hollywood, CA (US); Anthony Ahee, Grosse Pointe Shores, MI (US)

(*) Notice: Subject to any disclaimer, the term of this patent is extended or adjusted under 35 U.S.C. 154(b) by 0 days.

(21) Appl. No.: 15/385,847

(22) Filed: Dec. 20, 2016

(65) Prior Publication Data
US 2017/0095733 A1 Apr. 6, 2017

Related U.S. Application Data

(63) Continuation of application No. 14/329,248, filed on Jul. 11, 2014, now Pat. No. 9,539,507.

(60) Provisional application No. 61/879,408, filed on Sep. 18, 2013, provisional application No. 61/844,929, filed on Jul. 11, 2013.

(51) Int. Cl.
*A63F 13/24* (2014.01)
*A63F 13/98* (2014.01)

(52) U.S. Cl.
CPC .............. *A63F 13/24* (2014.09); *A63F 13/98* (2014.09)

(58) Field of Classification Search
CPC ................................ A63F 13/24; A63F 13/98
USPC .......................................................... 463/37
See application file for complete search history.

(56) References Cited

U.S. PATENT DOCUMENTS

| 4,359,222 | A | * | 11/1982 | Smith, III | H05K 5/0256 340/384.3 |
| 4,611,406 | A | * | 9/1986 | Engstrom | G06F 1/1626 33/430 |
| 5,046,739 | A | * | 9/1991 | Reichow | A63F 13/02 273/148 B |
| 5,667,220 | A | * | 9/1997 | Cheng | A63F 13/06 273/148 B |
| 5,919,092 | A | * | 7/1999 | Yokoi | A63F 13/06 463/37 |
| 6,102,802 | A | * | 8/2000 | Armstrong | A63F 13/06 463/37 |
| D475,710 | S | * | 6/2003 | Sheehan | G06F 3/0219 D14/401 |
| 6,659,870 | B2 | * | 12/2003 | Sobota | A63F 13/06 463/37 |
| D492,294 | S | * | 6/2004 | Kim | A63F 13/92 D14/240 |
| 7,095,442 | B2 | * | 8/2006 | van Zee | G06F 1/1626 348/333.01 |

(Continued)

FOREIGN PATENT DOCUMENTS

SE 1380324 A1 * 1/2004 ............. A63F 13/06

OTHER PUBLICATIONS

"Apple Working With Logitech and Moga For MFI Game Controllers, Details Framework at WWDC" written Mikey Campbell, published on or before Jun. 13, 2013, printed and accessible from URL <http://appleinsider.com/articles/13/06/13/apple-working-with-logitech-and-moga-for-mfi-game-controllers-details-framework-at-wwdc>, 2 pages.*

(Continued)

*Primary Examiner* — Robert T Clarke, Jr.

(57) ABSTRACT

An electronic smart device controller comprising a right side panel, a left side panel, and optionally a chassis and a detachable cradle. The right side panel and the left side panel can receive the chassis or the detachable cradle.

3 Claims, 20 Drawing Sheets

(56) References Cited

U.S. PATENT DOCUMENTS

| | | | | |
|---|---|---|---|---|
| 7,193,165 B2* | 3/2007 | Kawanobe | A63F 13/08 | 200/5 R |
| 7,407,439 B1* | 8/2008 | Ochoa | A63F 13/02 | 463/37 |
| 7,458,489 B1* | 12/2008 | Mudd | A45F 5/02 | 224/197 |
| 7,733,637 B1* | 6/2010 | Lam | G06F 1/1626 | 361/679.08 |
| 7,794,326 B2* | 9/2010 | Wu | A63F 13/06 | 463/37 |
| 7,833,097 B1* | 11/2010 | Maddox | A63F 13/23 | 455/556.1 |
| 7,846,027 B2* | 12/2010 | Meyer | A63F 13/08 | 463/46 |
| D664,601 S* | 7/2012 | Sogabe | H05K 5/0256 | D14/356 |
| D666,250 S* | 8/2012 | Fulghum | A63F 13/02 | D14/400 |
| D672,397 S* | 12/2012 | Wai | A63F 13/06 | D14/401 |
| D682,840 S* | 5/2013 | Tsai | A63F 13/02 | D14/447 |
| D682,947 S* | 5/2013 | Akama | A45F 5/02 | D21/333 |
| 8,439,753 B2* | 5/2013 | Wakitani | A63F 13/06 | 463/36 |
| 8,547,340 B2* | 10/2013 | Sizelove | B64D 11/0015 | 345/173 |
| 8,587,939 B2* | 11/2013 | McClure | G06F 1/1626 | 361/679.3 |
| D698,785 S* | 2/2014 | Canizares | A63F 13/92 | D14/341 |
| 8,648,679 B2* | 2/2014 | Lauder | H01F 7/04 | 206/320 |
| 8,825,123 B1* | 9/2014 | Gudino | A45C 11/00 | 348/333.01 |
| 9,005,025 B2* | 4/2015 | Joynes | A63F 13/06 | 463/37 |
| 9,724,601 B2* | 8/2017 | Fujita | A63F 13/23 | |
| 9,751,008 B2* | 9/2017 | Fujita | A63F 13/23 | |
| 9,757,647 B2* | 9/2017 | Fujita | A63F 13/23 | |
| 9,776,081 B2* | 10/2017 | Fujita | A63F 13/23 | |
| 9,782,671 B2* | 10/2017 | Fujita | A63F 13/23 | |
| 2001/0021668 A1* | 9/2001 | Takeda | A63F 13/02 | 463/38 |
| 2001/0045938 A1* | 11/2001 | Willner | A63F 13/24 | 345/156 |
| 2002/0145590 A1* | 10/2002 | Paolucci | G06F 1/1626 | 345/156 |
| 2002/0155890 A1* | 10/2002 | Ha | A63F 13/06 | 463/36 |
| 2004/0263696 A1* | 12/2004 | Rogers | H04B 1/202 | 348/734 |
| 2006/0286943 A1* | 12/2006 | Vance | A63F 13/06 | 455/90.1 |
| 2007/0045392 A1* | 3/2007 | Youens | G06F 1/1632 | 235/145 R |
| 2007/0178966 A1* | 8/2007 | Pohlman | A63F 13/06 | 463/36 |
| 2008/0146336 A1* | 6/2008 | Feldman | A63F 13/02 | 463/37 |
| 2009/0005164 A1* | 1/2009 | Chang | A63F 13/06 | 463/37 |
| 2009/0186650 A1* | 7/2009 | Kwak | G06F 1/1622 | 455/550.1 |
| 2009/0298590 A1* | 12/2009 | Marks | A63F 13/02 | 463/37 |
| 2010/0081505 A1* | 4/2010 | Alten | G06F 1/1632 | 463/36 |
| 2010/0118195 A1* | 5/2010 | Eom | G08C 17/00 | 348/564 |
| 2010/0195279 A1* | 8/2010 | Michael | G06F 1/1632 | 361/679.41 |
| 2010/0238119 A1* | 9/2010 | Dubrovsky | G06F 1/1626 | 345/169 |
| 2011/0001715 A1* | 1/2011 | Cha | H04M 1/0247 | 345/173 |
| 2012/0021834 A1* | 1/2012 | Garcia | A63F 13/24 | 463/38 |
| 2012/0044147 A1* | 2/2012 | Roka | G06F 1/1626 | 345/169 |
| 2012/0088582 A1* | 4/2012 | Wu | A63F 13/211 | 463/37 |
| 2012/0202597 A1* | 8/2012 | Yee | A63F 13/843 | 463/37 |
| 2012/0271967 A1* | 10/2012 | Hirschman | G06F 3/0219 | 710/8 |
| 2012/0302347 A1* | 11/2012 | Nicholson | A63F 13/24 | 463/37 |
| 2013/0017887 A1* | 1/2013 | Keithline | A63F 13/42 | 463/35 |
| 2013/0120258 A1* | 5/2013 | Maus | G06F 3/044 | 345/161 |
| 2013/0154542 A1* | 6/2013 | Joynes | A63F 13/02 | 320/101 |
| 2013/0154943 A1* | 6/2013 | Joynes | G06F 3/0219 | 345/169 |
| 2013/0154958 A1* | 6/2013 | Clavin | G06F 1/1626 | 345/173 |
| 2013/0157763 A1* | 6/2013 | Joynes | A63F 13/06 | 463/32 |
| 2013/0157764 A1* | 6/2013 | Joynes | A63F 13/23 | 463/37 |
| 2013/0184077 A1* | 7/2013 | Galpern | A63F 13/02 | 463/37 |
| 2013/0341214 A1* | 12/2013 | King | A63F 13/06 | 206/216 |
| 2014/0206451 A1* | 7/2014 | Helmes | G06F 3/04847 | 463/39 |
| 2014/0247246 A1* | 9/2014 | Maus | G06F 1/1632 | 345/174 |
| 2014/0268544 A1* | 9/2014 | Johnson | B60R 11/0252 | 361/679.44 |
| 2015/0149668 A1* | 5/2015 | Joynes | A63F 13/23 | 710/62 |
| 2016/0361640 A1* | 12/2016 | Iwao | A63F 13/23 | |
| 2016/0361641 A1* | 12/2016 | Koizumi | A63F 13/843 | |

OTHER PUBLICATIONS

"Moga Ace Game Controller" printed and accessible from URL <http://www.mogaanywhere.com/ace/>, 3 pages.*

"PhoneJoy Play Functional Prototype" published by PhoneJoy via YouTube on Dec. 3, 2012, printed and accessible from URL <https://www.youtube.com/watch?v=Vhv49cCyAml>, 3 pages.*

"Description of MFI Controllers" printed and accessible from URL <https://mficontrollers.afterpad.com/>, 8 pages.*

"Review of Logitech Powershell Controller" written by Neil Hughes, published on or before Dec. 22, 2013, accessed and printed from URL <http://appleinsider.com/articles/13/12/22/review-logitech-powershell-controller-for-iphone>, 11 pages.*

"Description of Gamevice" published on or before Sep. 12, 2014, accessed and printed from URL <http://web.archive.org/web/20140912044019/http://www.gamevice.com/>.*

"Review of Moga Ace Power Game Controller" written by Neil Hughes, published on or before Dec. 20, 2013, accessed and printed from URL <http://appleinsider.com/articles/13/12/20/review-moga-ace-power-game-controller-for-apples-iphone>, 14 pages.*

"AirPlay Demo iPhone 4" published to YouTube on or before Nov. 24, 2010, accessed and printed from URL <https://www.youtube.com/watch?v=4f-mT8rPxv4>, 3 pages.*

"Xbox 360 wired and wireless controllers" written by Microsoft, published on or before Mar. 5, 2013, printed and accessible from

(56) References Cited

OTHER PUBLICATIONS

URL <https://web.archive.org/web/20130305150115/https://support.xbox.com/en-US/xbox-360/accessories/controllers>, 3 pages.*

* cited by examiner

APPARATUS AND METHOD FOR CONTROLLER ACCESSORY

INCORPORATION BY REFERENCE TO RELATED APPLICATIONS

This application is a continuation of U.S. U.S. application Ser. No. 14/329,248, filed Jul. 11, 2014, which claims the benefit of priority under 35 U.S.C. § 119(e) to U.S. Provisional Application No. 61/879,408, filed Sep. 18, 2013, and U.S. Provisional Application No. 61/844,929, filed Jul. 11, 2013. The above applications are hereby incorporated herein by reference in their entirety and are to be considered as a part of this specification.

BACKGROUND OF THE INVENTION

Field of the Invention

The present invention relates generally to controllers for electronic devices. More specifically, the present invention relates to game controllers for hand-held smart devices.

Description of the Related Art

With a growing number of hand-held electronic devices available to consumers, there is an increasing need for secondary accessories that modify and enhance these devices. Many such accessories exploit existing capabilities of the hand-held devices by enhancing and simplifying a consumer's ability to use the device. As an example, an accessory may modify a hand-held device so that an attachment provides additional functionalities to the device. As another example, an attachment may enhance a user's ability to enjoy application software available for the smart devices, such as game applications, by providing additional controls.

One of the more recently developed electronic devices are e-readers, tablets, or smart devices having relatively large screens. These smart devices are often used for reading books, internet browsing, watching stored movies, playing games, and other work or recreational activities. Many of these devices, as well as some popular cell phones, and in particular smart phones, have evolved to having a full touch screen and no traditional attachments, such as an alphanumeric keyboard, joystick, or a game controller. Touch screens also present additional challenges to game users in that the lack of a traditional keyboard, joystick, or a controller generally decreases a user's ability to react with sufficient comfort, ease, and speed to the demands of a game application. For example, by navigating a game application by means of a touch screen, a user typically utilizes only an index finger of one hand as opposed to traditional game controllers which provide a variety of controls and buttons so that a user may engage one or more fingers of both hands. As another example, controlling a smart device software application, such as a game application, by means of a touch screen may present a problem in that a user may block certain parts of the touch screen while engaging fingers on the touch screen. Thus, a user may be deprived of a higher level of enjoyment of the smart device game and other applications. Further, most smart hand-held devices are not equipped for long-term use in that a user must continuously hold or otherwise prop-up the device. For example, the smart devices themselves are generally planar and need to be propped or angled by hand to view the screen. This can be cumbersome and taxing for extended periods of time and challenging when the user engages in use of a game or other application. Even though many smart devices have the capability to function like a personal computer or another gaming device, most are not designed for such extensive usage. As a result, a number of secondary accessories have been developed to modify the smart devices for enhanced and simplified use such as an attachable keyboard. However, there is a lack of an accessory providing additional controls which a user could utilize for a smart device software applications such as game applications.

Game accessories such as game controllers are known in the art. For example, U.S. Pat. No. 6,102,802 discloses a game controller with pressure-sensitive analog sensors for video game machines. U.S. Pat. No. 6,659,870 discloses a game controller with an additional steering lever. U.S. Pat. No. 7,794,326 further discloses a game controller with a variety of controls and pivotal grips ensuring ergonomics of the game controller. The problem is that none of the game controllers are compatible and can be used with the smart hand-held devices such as iPhone®, iPad®, or iPad Mini.

Therefore, there remains a need for a game controller accessory for electronic smart devices that provides a user with enhanced ability to utilize and enjoy the smart device application software by offering additional control options besides the touch screen.

SUMMARY OF THE INVENTION

The present invention addresses one or more of the above needs by providing a controller accessory for hand-held smart devices. One possible embodiment of the present teachings includes: an electronic smart device controller comprising a right side panel, a left side panel, a detachable chassis, and a detachable cradle. The right side panel and the left side panel may receive the detachable chassis or the detachable cradle, such that the detachable chassis can be fastened between the right side panel and the left side panel. The detachable cradle may be fastened between the right side panel and the left side panel, such that the detachable chassis can be completely removed and substituted with a detachable cradle, so that the detachable cradle is substantially planar with a depression portion and serves as a housing for a smart device. The smart device may be inserted into the depression portion of the cradle so that the cradle can support the smart device, and wherein the cradle with the smart device is attached to the right side panel and the left side panel.

Another possible embodiment of the present teachings includes: an electronic smart device controller comprising a right side panel, a left side panel and an undetachable cradle. The undetachable cradle may be fastened to the right side panel and the left side panel, such that the undetachable cradle is substantially planar with a depression portion and serves as a housing for a smart device. The smart device may be inserted into the depression portion so that the controller can support the smart device.

The teachings herein also provide for a method comprising: providing (i) a right side panel, (ii) a left side panel, and (iii) a detachable chassis and attaching the right side panel to the detachable chassis on the right side of the chassis and attaching the left side panel to the detachable chassis on the left side of the chassis. The method may include detaching the right side panel from the detachable chassis and detaching the left side panel from the detachable chassis. The method may further include providing a right side panel, a left side panel, a smart device, and a detachable cradle having dimensions fit for supporting the smart device, a depression portion to house the smart device, and a raised wall. The method may also include inserting the smart device into the depression portion of the cradle so that it is leaning against the raised wall of the cradle, inserting the cradle with the smart device to the right side panel and the left side panel, and attaching the right side panel and the left side panel to the detachable cradle securely.

The present teachings provide a controller that is specifically compatible and fit for one or more smart devices by providing a detachable or undetachable cradle for supporting the one or more smart devices; therefore the user is not limited to controlling the smart device software application with touch screen only. In addition, the controller allows for enhanced enjoyment of the user's smart device by enabling the user to utilize both hands in controlling the software applications at the same time, therefore increasing the number of control options the user has, the speed and quality of the user's response to the demands of the software applications, and adding overall flexibility in use and function of the smart device.

DETAILED DESCRIPTION

Figure 1:
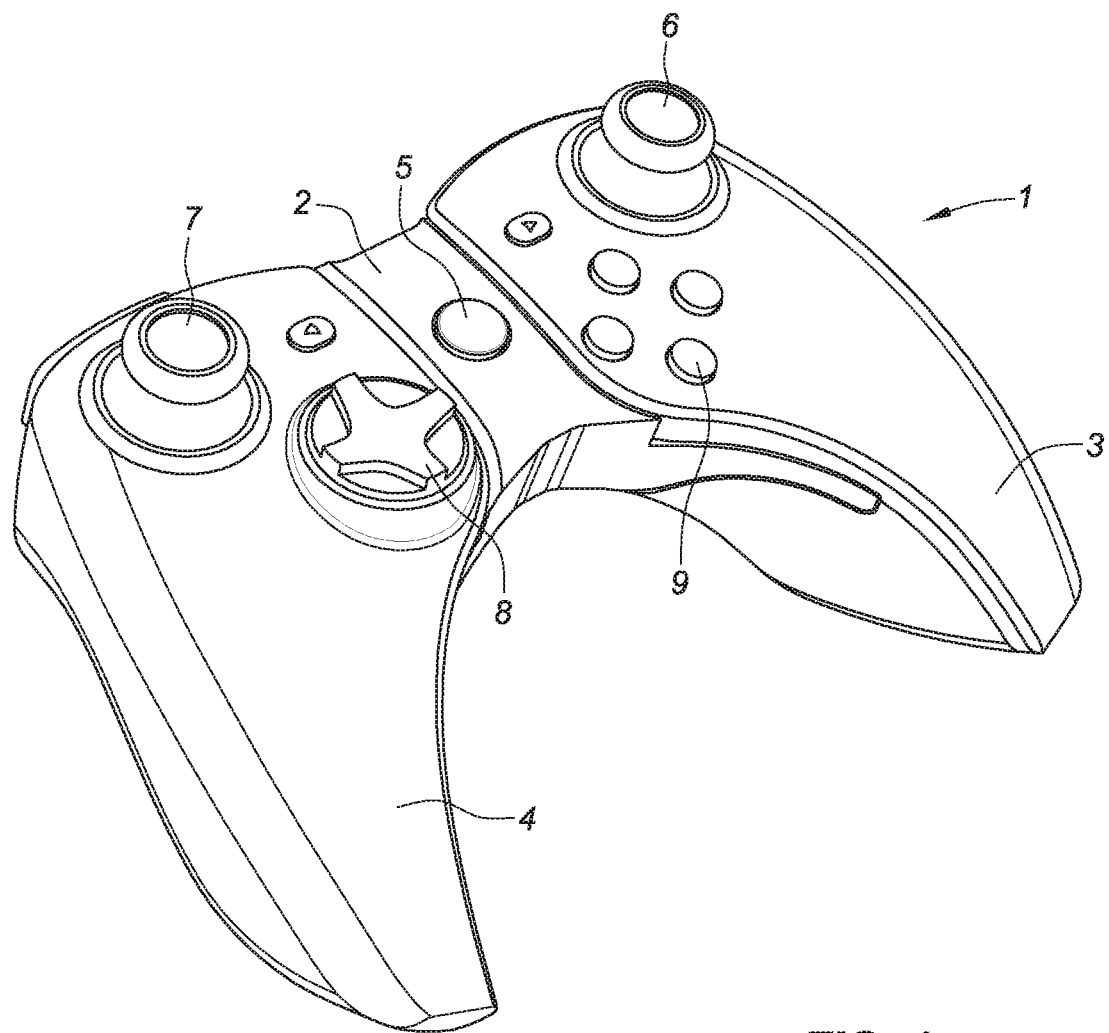
FIG. 1 is a perspective view of an illustrative example of the controller, shown assembled with the detachable chassis and side panels in accordance with the present teachings.

This application claims the benefit of the filing date of U.S. Provisional Application Nos. 61/844,929 (filed Jul. 11, 2013) and 61/879,408 (filed Sep. 18, 2013), the entirety of the contents of these applications being hereby incorporated by reference herein for all purposes.

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings provide a controller accessory for an electronic digital device, such as a hands-free smart device that may be cordless, mobile, capable of voice and video communication, internet browsing, and autonomous operation. The controller can function with a variety of smart devices, such as digital media extenders, smart phones, and tablets; more specifically with iOS (iPhone OS) devices such as Apple TV®, iPhone®, iPad®, or iPad Mini.

The controller may have any size, shape, configuration, or a combination thereof so that the controller may house internal parts of a common game controller, such as a printed circuit board and may be gripped with a left hand, right hand, or both. Preferably, the controller has an ergonomic shape so that the controller accommodates one or more fingers of a right hand and/or one or more fingers of a left hand, feels comfortable to the user, reduces soreness and cramps after extended use, and allows for 3-D motion enhanced gaming.

In one embodiment, the controller comprises a right side panel, a left side panel, a detachable chassis, and a detachable cradle. The right side panel accommodates controls for the right hand. The right side panel may be attachable to the right side of the chassis and/or the right side of the cradle. The right side panel may have any size, shape, configuration, or a combination thereof so that the right side panel can be gripped with a right hand. Preferably, the right side panel has an ergonomic shape so that the right side panel accommodates one or more fingers of the right hand so that the one or more fingers of the right hand may provide input. Even more preferably, the right side panel has such shape that when a smart device is inserted into the controller, the right side panel does not block any of the smart device's controls and allows the user full utilization of the smart device including the smart device's screen, speakers, volume button, power on/off button, camera, a combination thereof, or the like.

The left side panel accommodates controls for the left hand. The left side panel is attachable to the left side of the chassis and/or the left side of the cradle. The left side panel may have any size, shape, configuration, or a combination thereof so that the left side panel can be gripped with a left hand. Preferably, the left side panel has an ergonomic shape so that the left side panel accommodates one or more fingers of the left hand so that the one or more fingers of the left hand may provide input. Even more preferably, the left side panel has such shape that when a smart device is inserted into the controller, the left side panel does not block any of the smart device's controls and allows the user full utilization of the smart device including the smart device's screen, speakers, volume button, power on/off button, camera, a combination thereof, or the like.

The right side panel, the left side panel, or both may further include one or more openings to accommodate a chassis, a cradle, a smart device or some combination thereof. The openings may have any size, shape, configuration, or a combination thereof so that the chassis, a cradle, a smart device, or both fit securely between the right side panel and the left side panel. Preferably, the openings are slots in the inner middle sections of the right side panel and left side panel. More preferably, the openings have dimensions corresponding to the dimensions of the connection parts of the chassis, the cradle, or both.

The chassis serves as a central piece of the controller. The chassis may have any size, shape, configuration, or a combination thereof so that the chassis can accommodate the right side panel on the right side and the left side panel on the left side. The chassis may be detachable. The chassis may have one or more connection parts providing secure connection to the right side panel and/or the left side panel. The connection can be any connection commonly utilized in controllers, preferably a connection which allows for easy and frequent assembly and disassembly of the controller, such as a magnetic connection, a snap-fit connection, a combination thereof, or the like. The snap-fit connection can be any shape, size, configuration or a combination thereof, such as a cantilever beam snap fit, a cylindrical snap fit, a spherical snap fit, a combination thereof, or the like. The chassis may also have one or more connection parts which correspond to and can be fitted into the one or more openings in the right side panel, the left side panel, or both.

The right side panel, the left side panel, the chassis, or a combination thereof may include one or more controls, such as gaming controls, such as an analog stick, dual analog sticks, directional pad, arrow buttons, face action buttons, shoulder buttons, start and select buttons, on and off buttons, guide buttons, back buttons, central buttons, or the like. The right side panel, the left side panel, the chassis, or a combination thereof may also include at least one specialized control, such as a steering wheel. The controls may be single or multi-functional, have a given function or be assigned a variety of functions. The controls may be backlit, removable or non-removable, and interchangeable. The controls may be made of any material commonly utilized in controls for electronic devices, such as plastic, or the like; more preferably rubber or acrylic. Preferably, the controls are made of a material which offers sufficient grip, is pleasant to the user's touch, can be easily cleaned, and can withstand a prolonged use. The controls may be incorporated into the controller in any layout, such as a full-size console layout. Preferably, the layout of the controls is as user friendly as possible, such as that the layout encourages repeated presses of the same control or mimics actual triggers such as those found on guns, or the like.

The controller assembled with the right side panel and the left side panel attached to the chassis may be utilized as a controller for digital media extenders, such as Apple TV®. The controller including the right side panel, the left side panel, and the chassis can be disassembled, the chassis can be completely removed and replaced with a detachable cradle which will accommodate and support a smart device, such as iPhone®, iPad®, iPad Mini, or the like. The controller panels may attach directly to a smart device and may be free of any chassis or cradle. The controller, the right side panel and the left side panel are universal in a sense that the right side panel and the left side panel can be used with detachable cradles of various sizes, shapes, and configurations, accommodating a variety of smart devices.

The cradle serves as a support for a smart device. The cradle of all embodiments of this invention may have any size, shape, configuration, or a combination thereof so that the cradle can accommodate a smart device, such as iPhone®, iPad®, iPad Mini, or the like. The cradle may have a shape corresponding to a shape of a smart device to be inserted in the cradle such as a rectangle, square, or the like. Preferably, the cradle is substantially planar and has the dimensions corresponding to dimensions of a specific smart device so that the cradle can accommodate the specific smart device. Preferably, the cradle has shape and dimensions so that the smart device fits snuggly against the cradle and can be securely placed, inserted, slid, attached, and the like to the cradle without being able to change location within the cradle. The controller may also be free of any cradle portion.

The cradle may have other features which will enhance secure accommodation of a smart device within the cradle, such as a depression portion, one or more slots, and one or more raised walls. The depression portion, the one or more slots, the one or more raised walls, or a combination thereof may have any size, shape, configuration, or a combination thereof so that the cradle can accommodate a smart device securely. Preferably, the depression portion, the one or more slots, the one or more raised walls have the dimensions to accommodate a specific smart device so that the smart device fits snuggly and can be securely placed in the depression portion, against the one or more raised walls, or a combination thereof without being able to change location within the cradle. A user may slide a smart device in the one or more slots. Preferably, the smart device is easy to slide in and out of the one or more slots while fitting snuggly enough within the one or more slots as to prevent accidental discharge of the smart device from the one or more slots. Preferably, the cradle has a raised wall on the cradle's right side, left side, front side, back side, and/or a combination thereof.

The cradle may include one or more openings, such as a central opening. The one or more openings may have any size, shape, configuration, or a combination thereof so that the one or more portions, such as a back portion of a smart device inserted in the cradle is at least partially visible through the one or more openings. The cradle may provide support along the whole perimeter of the smart device or along certain parts of the perimeter of the smart device, such as the cradle may provide support along one, two, or three sides of the smart device, leaving the remaining sides free of support. The cradle may also have no opening so that the cradle can offer maximum support for a smart device.

The cradle may further include one or more device openings. The one or more device openings may have any size, shape, configuration, or a combination thereof so that one or more controls and a screen of a smart device are not covered by the cradle. Preferably, the one or more device openings correspond to the shape and dimensions of the one or more controls of the smart device, such as an on and off button, a reset button, a volume button, a microphone opening, a speaker, a screen brightness adjuster, a camera lens, an opening for a charger, or the like. More preferably, the one or more device openings correspond to the shape and dimensions of the one or more controls of the smart device in such a way that the user is not prevented from manipulating and utilizing the one or more functions and one or more controls of the smart device while the smart device is placed in the cradle, while the smart device in the cradle is inserted between the right side panel and the left side panel, or both.

The cradle may be attached to the right side panel on the right side and the left side panel on the left side. The cradle may be detachable. The cradle may have one or more connection parts providing secure connection to the right side panel and the left side panel. The connection can be any connection commonly utilized in controllers, preferably a connection which allows for easy and frequent assembly and disassembly of the controller, such as a magnetic connection, a snap-fit connection, mechanical keys, a combination thereof, or the like. The snap-fit connection can be any shape, size, configuration or a combination thereof, such as a cantilever beam snap fit, a cylindrical snap fit, a spherical snap fit, a combination thereof, or the like. The cradle may also have one or more connection parts which correspond to and can be fitted into the one or more openings in the right side panel, the left side panel, or both.

The cradle may include additional support components on one or more sides of the cradle, such as support wings which may slide into the one or more openings in the right side panel, the left side panel, or both.

The controller may include additional components enhancing use of the controller. For example, the controller may include at least one wireless connection, such as Bluetooth® or infrared light-emitting diodes (LEDs) for exchanging data between the smart device and the controller in the right side panel, left side panel, the chassis, the cradle, or a combination thereof. Preferably, the controller has Bluetooth® connectivity.

The controller may include at least one power connector to provide a wired connection between the smart device and the controller in the right side panel, left side panel, the cradle, or a combination thereof. The at least one power connector may be any connector typically utilized to connect a smart device to a host device, such as a 30-pin dock connector or Apple Lightning® connector.

The controller may be powered by wires, have power storage, such as at least one battery, or a combination thereof. The controller may offer one or more power saver modes which provide for an extended battery life. The power storage may be any battery commonly used in controllers, such as AA batteries. The battery may be any size, shape, configuration, or a combination thereof. The battery can be rechargeable or non-rechargeable. The power storage can be a rechargeable or non-rechargeable battery pack made of any material commonly used in battery packs, such as nickel metal hydride so that the battery provides a user with extended continuous gaming experience.

The controller may further include at least one docking port enabling charging of the smart device while the smart device is inserted into the controller in the right side panel, left side panel, the cradle, or a combination thereof. The at least one docking port may have any size, shape, configuration, or a combination thereof so that it enables charging of the smart device.

The controller may include one or more speakers in the right side panel, left side panel, the chassis, the cradle, or a combination thereof. The one or more speakers may be located on any side of the right side panel, left side panel, or the chassis. The one or more speakers may have any size, shape, configuration, or a combination thereof so that the user may utilize sound effects offered by the smart device application software.

The controller may include at least one device enabling vibration of the controller in the right side panel, left side panel, the chassis, the cradle, or a combination thereof. The at least one device enabling vibration may have any size, shape, configuration, or a combination thereof so that the user may experience enhanced enjoyment of effects offered by the smart device application software.

The controller may include at least one microphone jack in the right side panel, left side panel, the chassis, the cradle, or a combination thereof. The one or more microphone jacks may be located on any side of the right side panel, left side panel, the chassis, or the cradle.

In an alternative embodiment, the controller may have a right side panel, a left side panel, and a nondetachable cradle, but may not include a detachable chassis. The right side panel is affixed to the right side of the undetachable cradle and the left side panel is affixed to the left side of the undetachable cradle so that a user does not detach the cradle. The connection between the right side panel, the left side panel, and the cradle can be any connection as described above, such as a magnetic connection, a snap-fit connection, a combination thereof, or the like. Additionally, the right side panel and the left side panel may be attached to the cradle by means of glue application or fasteners including but not limited to screws, bolt, nuts, a combination thereof, or the like. In this embodiment, the controller may accommodate a specific smart device with dimensions corresponding to the dimensions of the undetachable cradle.

The controller of all embodiments of this invention may be made of any material commonly utilized in controllers for electronic devices, such as plastic, or the like. Preferably, the controller is made of a lightweight material which can withstand a prolonged use, can be easily cleaned, is pleasant to the user's touch, and is anti-static.

A secure accommodation of a smart device in a detachable or undetachable cradle may require materials offering requisite rigidity such as polymeric materials including but not limited to thermoplastics, thermoset plastics, elastomeric materials or any combination thereof. Examples of polymeric and elastomeric materials that may be employed include nylon, polyvinyl chloride, polypropylene, high-density polyethylene, low-density polyethylene, linear low-density polyethylene, polyvinylidene chloride polyamide, polyester, polystyrene, polyethylene, polyethylene terephthalate, bio-based plastics/biopolymers (e.g., poly lactic acid), silicone, acrylonitrile butadiene styrene (ABS), polycarbonate (PC), a blend of ABS and PC, rubber, polyisoprene, butyl rubber, polybutadiene, EPM rubber, EPDM rubber, or any combination thereof. Additional suitable materials may include bio-plastics such as those derived from wood pulp-based lignin (e.g., liquid wood), sugarcane or other petroleum-free moldable materials. Different components of the controller may be composed of different materials. As an example, the right side portion and the left side portion may be made of a different material than the chassis or the cradle.

One or more surfaces of the controller (including the right side portion, the left side portion, the chassis, the cradle, the controls) may include rubberized/elastomeric portions. A tactile or textured coating may be provided to offer a comfortable and sure gripping surface for a user for ease of carrying and utilizing the controller. Preferably, some parts of the controller have non-slip rubber surface to ensure enhanced grip.

The method may include one or more of the following steps, and the steps may be performed in virtually any order. Locating and providing a right side panel, a left side panel, and a detachable chassis. Assembling the controller by using the right side panel, the left side panel, and the detachable chassis. Engaging connection parts of the detachable chassis and connection, opening, or both of the right side panel. Attaching the right side panel to the detachable chassis on the right side of the chassis. Engaging connection parts of the detachable chassis and connection, opening, or both of the left side panel. Attaching the left side panel to the detachable chassis on the left side of the chassis. Disassembling the controller. Detaching the right side panel from the detachable chassis. Detaching the left side panel from the detachable chassis. Locating and providing a right side panel, a left side panel, a smart device, and a detachable cradle having: dimensions fit for supporting the smart device, a depression portion to house the smart device, and a raised wall. Assembling the controller by using the right side panel, the left side panel, and the detachable cradle. Inserting the smart device into the depression portion of the cradle so that the smart device is leaning against the raised wall of the cradle. Inserting the cradle with the smart device to the right side panel and the left side panel. Attaching the right side panel and the left side panel to the cradle securely. Engaging connection parts of the detachable cradle and connection, opening, or both of the right side panel. Attaching the right side panel to the detachable cradle on the right side of the cradle. Engaging connection parts of the detachable cradle and connection, opening, or both of the left side panel. Attaching the left side panel to the detachable cradle on the left side of the chassis.

The method may also include locating and providing a controller comprising the right side panel, the left side panel, and the undetachable cradle; locating a smart device of dimensions corresponding to the dimensions of the undetachable cradle; and inserting the smart device into the undetachable cradle of the controller.

FIG. 1 is a perspective view of an illustrative example of the controller 1, shown assembled with the detachable chassis 2 and side panels 3, 4 in accordance with the present teachings. The right side panel 3 is shown with a right analog stick 6 and a set of four face action buttons 9 and the left side panel 4 is shown with a left analog stick 7 and the directional pad 8. The chassis 2 is shown with a central button 5.

Figure 2:
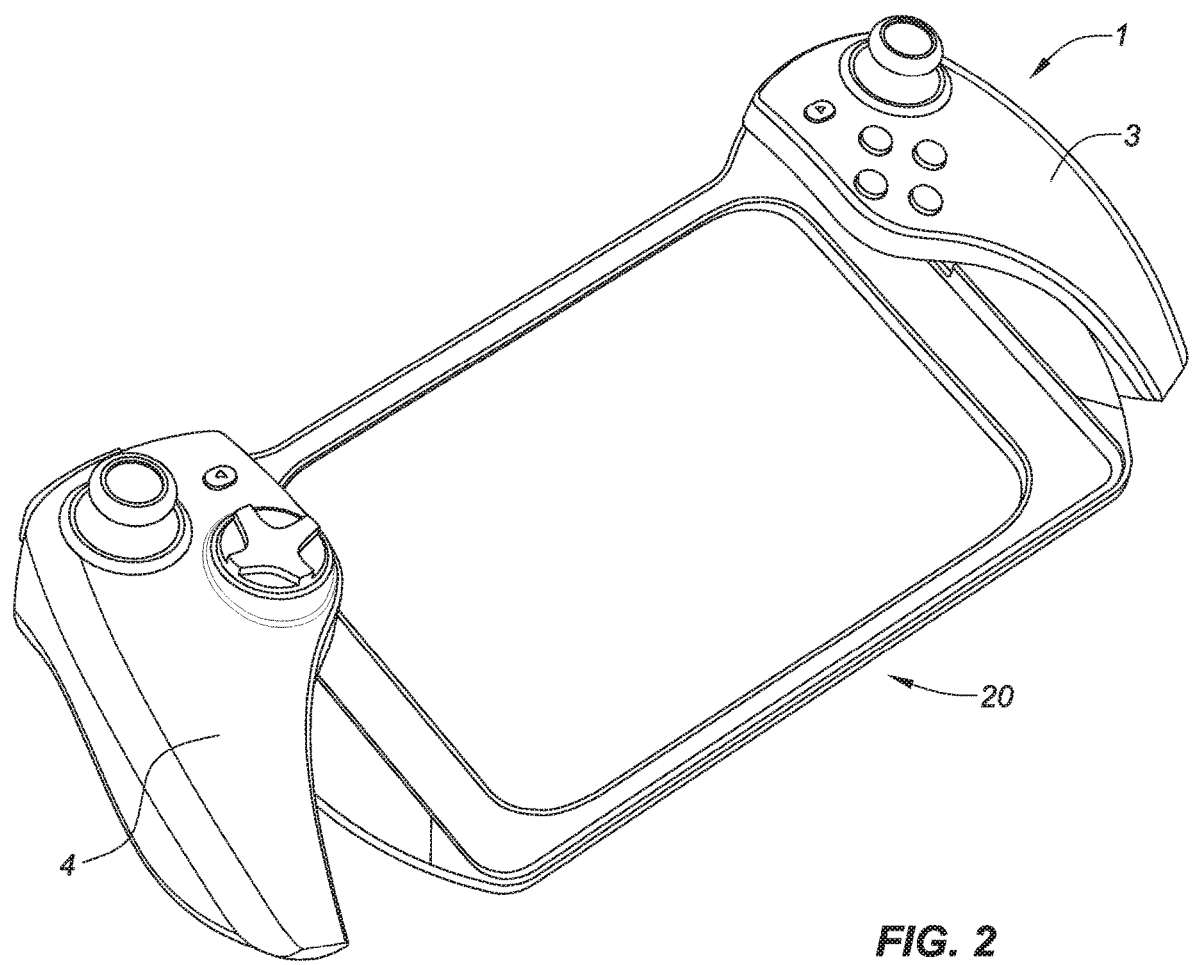
FIG. 2 is a perspective view of the controller of FIG. 1 with the detachable chassis (not shown) removed, shown assembled with the detachable cradle to accommodate a smart device (not shown) in accordance with the present teachings.

FIG. 2 is a perspective view of the controller 1 of FIG. 1 with the detachable chassis 2 (not shown) removed, shown assembled with the detachable cradle 20 to accommodate a smart device 30 (not shown) in accordance with the present teachings. As illustrated, the detachable cradle 20 is inserted between and securely connected to the right side panel 3 and the left side panel 4.

Figure 3:
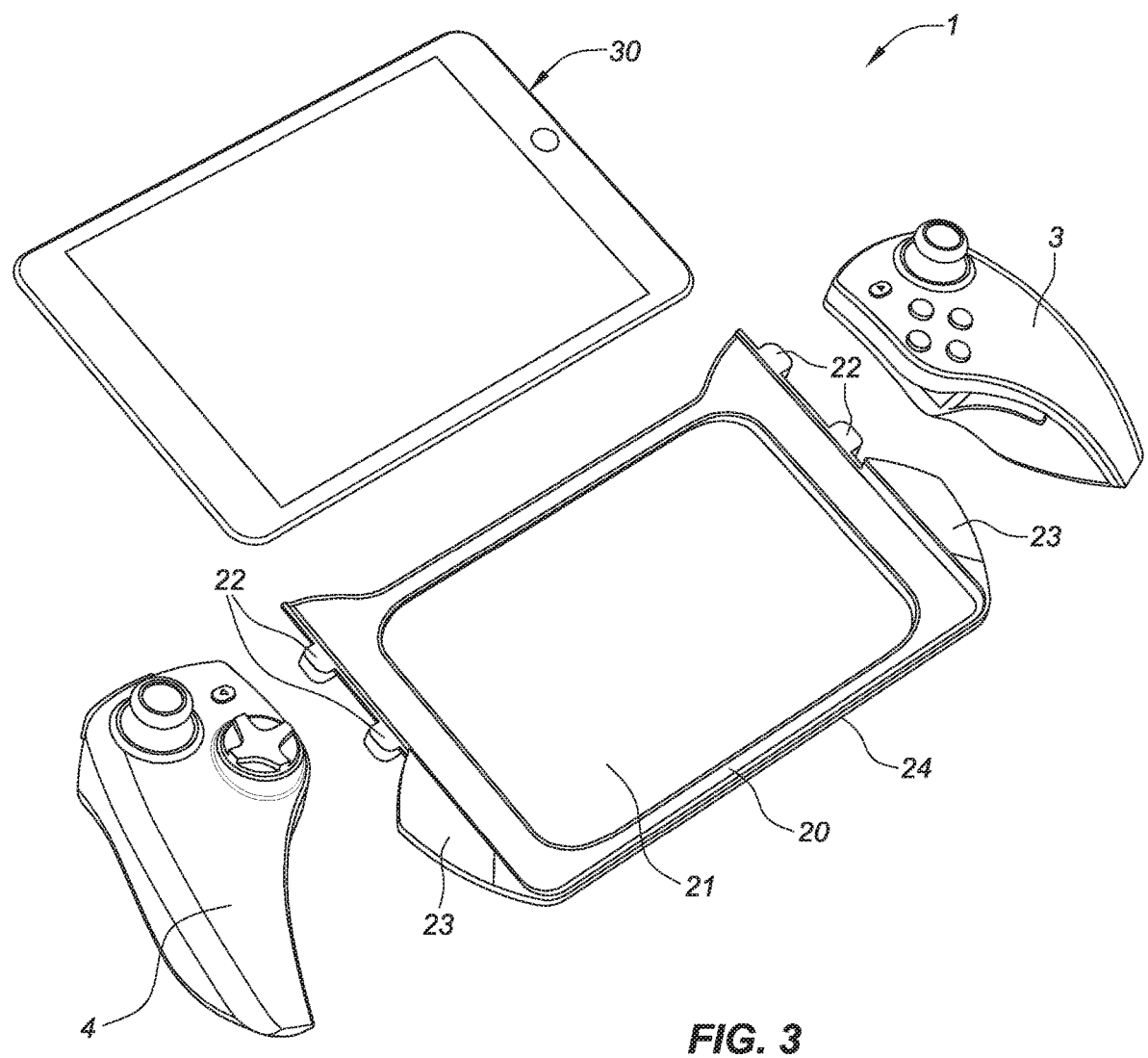
FIG. 3 is a perspective view of the controller of FIG. 1 illustrating the disassembled controller's right and left side panels, the detachable cradle, and a smart device.

FIG. 3 is a perspective view of the controller 1 of FIG. 1 illustrating the disassembled controller's right and left side panels 3, 4, the detachable cradle 20, and a smart device 30. The smart device 30 is to be placed on the detachable cradle 20 and inserted into the right and left side panels 3, 4. The cradle 20 is shown with a central opening 21 in the middle of the detachable cradle 20, four mechanical keys 22 on the right and left sides of the detachable cradle 20, and two support components 23 on the right and left sides of the detachable cradle 20. The detachable cradle 20 further includes a raised wall 24 on the right side, left side, and the front side of the detachable cradle 20 to support a smart device 30 once the smart device 30 is inserted into the detachable cradle 20.

Figure 4:
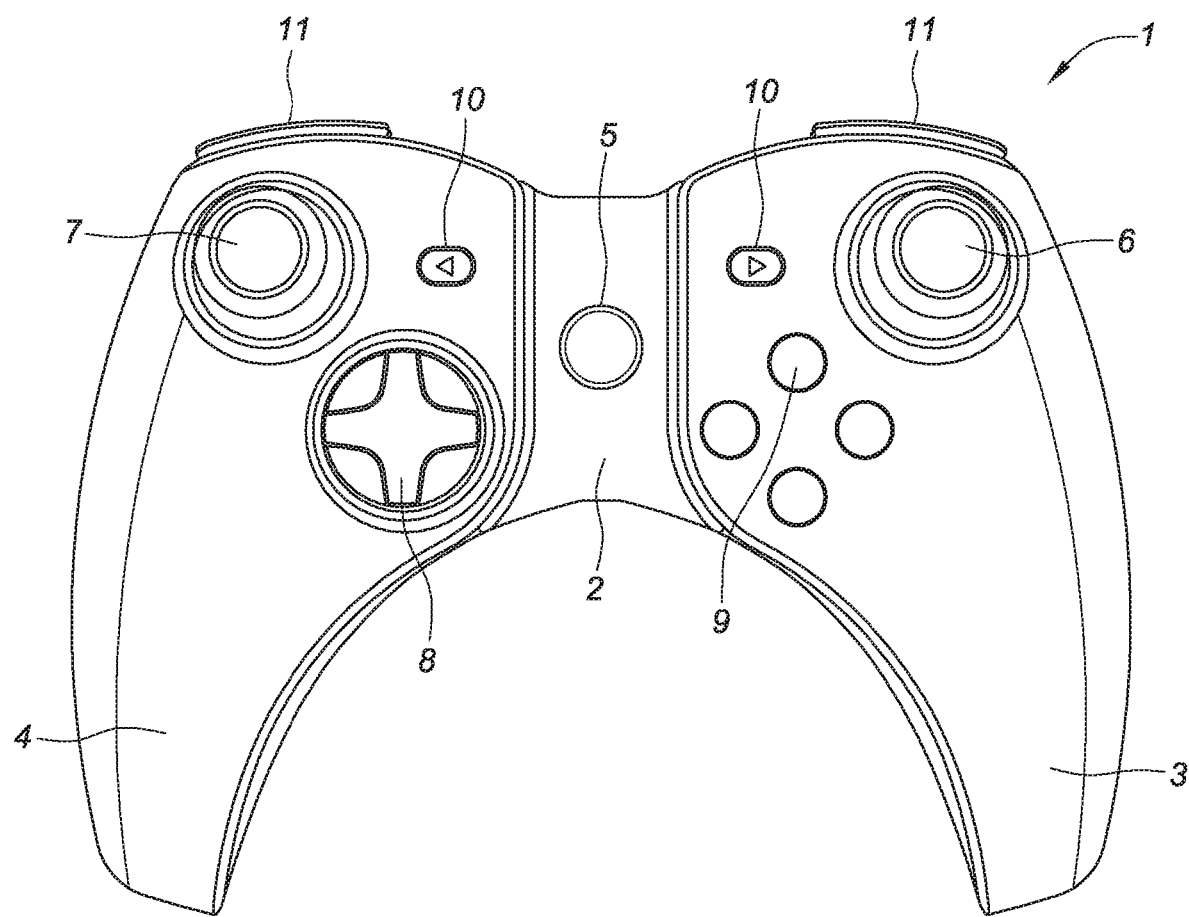
FIG. 4 is a perspective view of the front of the controller of FIG. 1 with the right and left side panels attached to the detachable chassis.

FIG. 4 is a perspective view of the front of the controller 1 of FIG. 1 with the right and left side panels 3, 4 attached to the detachable chassis 2. The detachable chassis 2 is shown attached to the right and left side panels 3, 4 and including a central button 5. The right side panel 3 is shown with the right analog stick 6, the set of face action buttons 9, an arrow button 10, and a shoulder button 11. The left side panel 4 is shown with the left analog stick 7, the directional pad 8, an arrow button 10, and a shoulder button 11.

Figure 5:
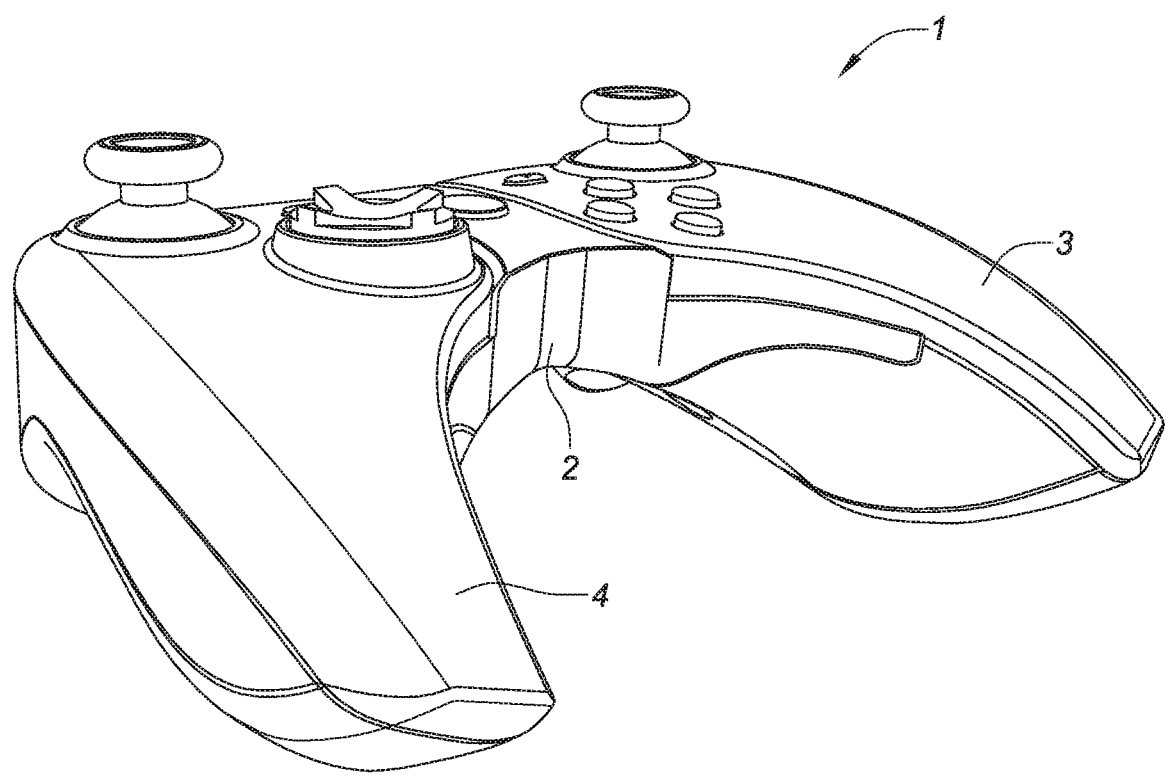
FIG. 5 is a perspective side view of the controller of FIG. 1.

FIG. 5 is a perspective side view of the controller 1 of FIG. 1. The controller is shown with the detachable chassis 2 attached to the right side panel 3 and the left side panel 4.

Figure 6:
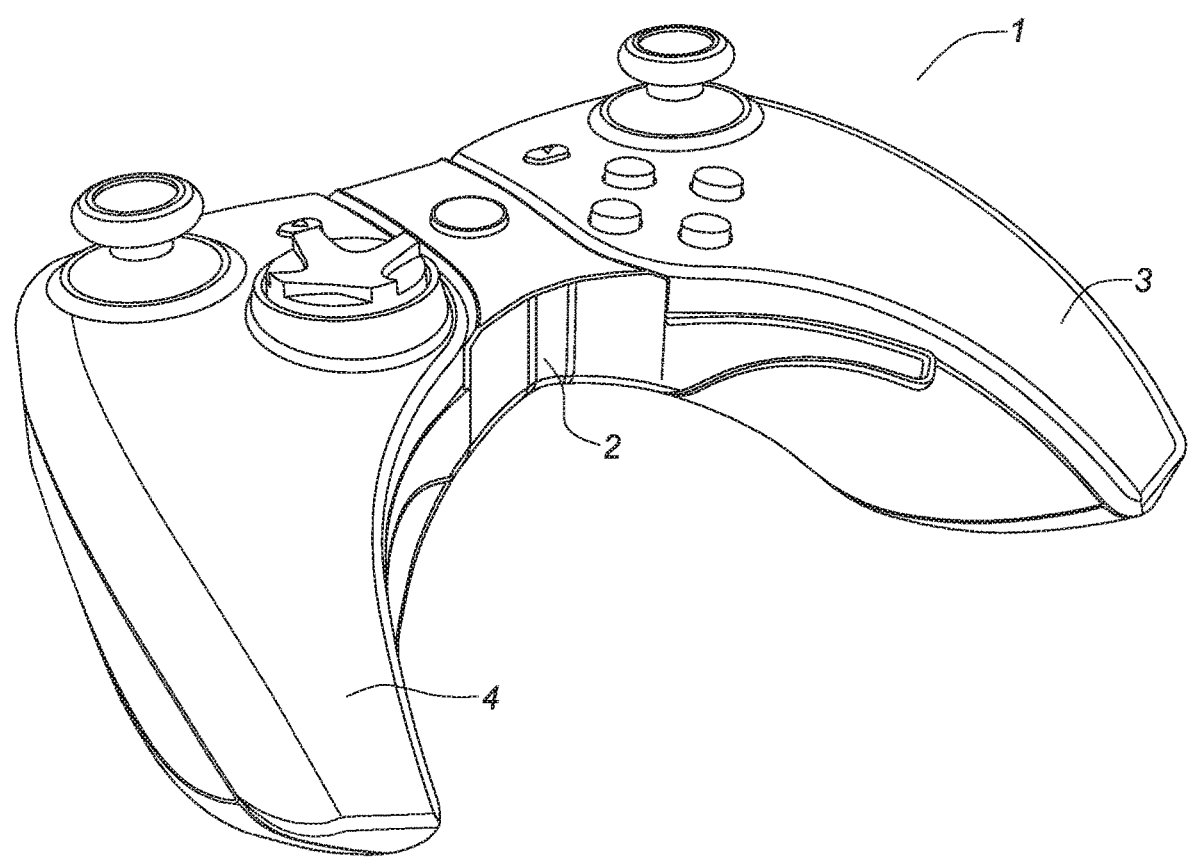
FIG. 6 is a perspective top view of the controller of FIG. 1.

FIG. 6 is a perspective top view of the controller 1 of FIG. 1. The controller is shown with the detachable chassis 2 attached to the right side panel 3 and the left side panel 4.

Figure 7:
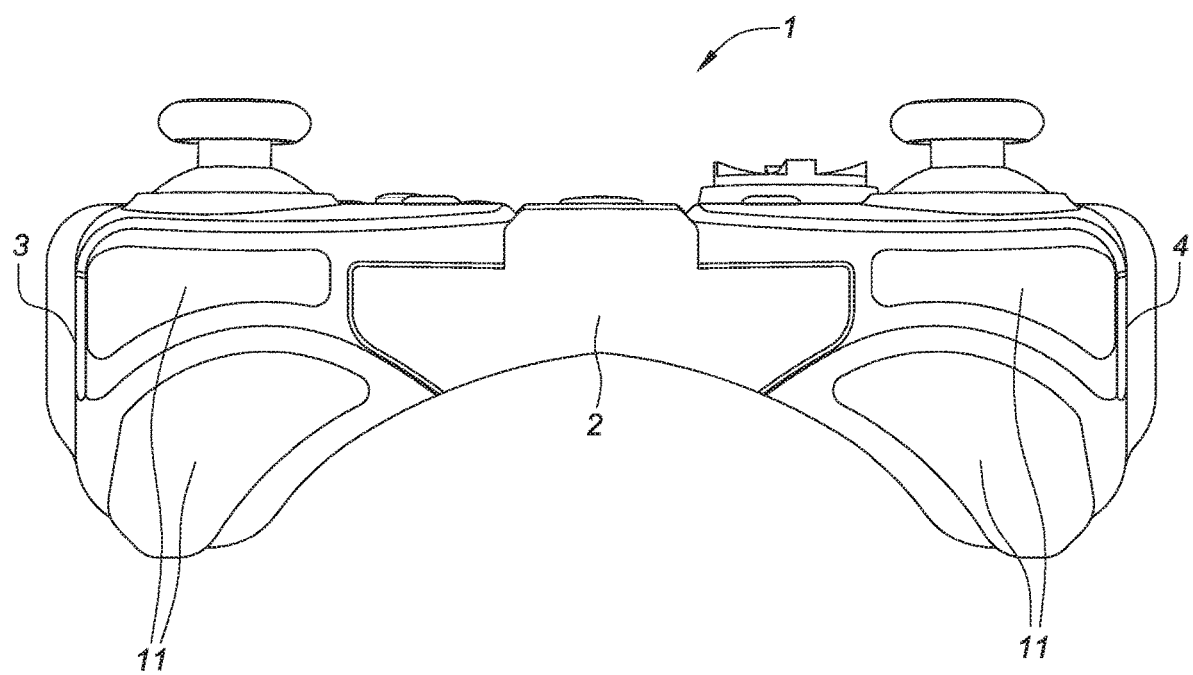
FIG. 7 is a perspective view of the back of the controller of FIG. 1.

FIG. 7 is a perspective view of the back of the controller 1 of FIG. 1. The controller is shown with the detachable chassis 2 attached to the right side panel 3 and the left side panel 4. As illustrated, the back of the right side panel 3 and left side panel 4 includes two shoulder buttons 11 each.

Figure 8:
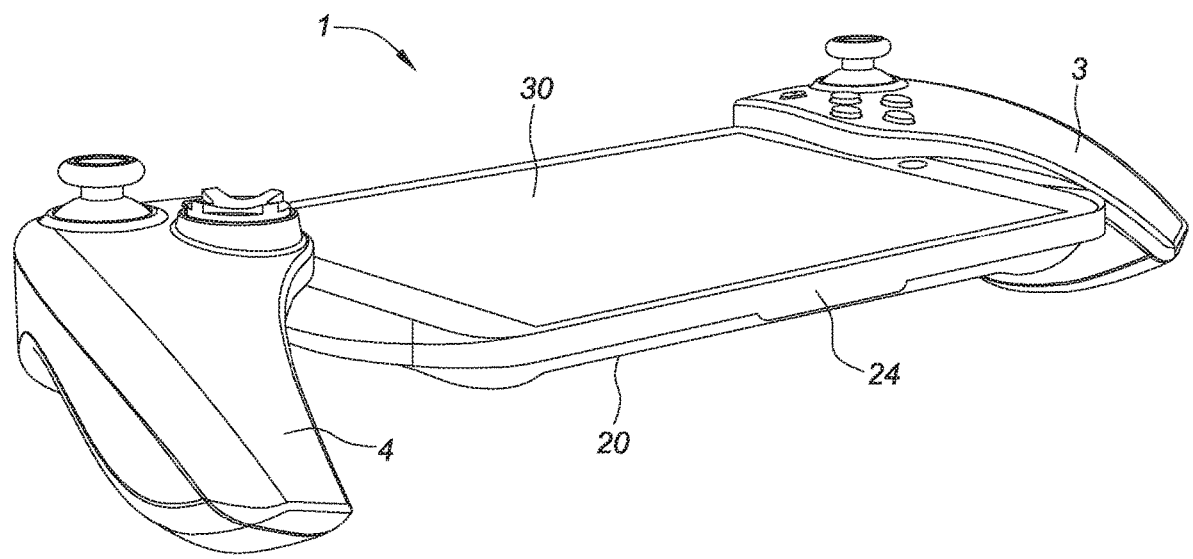
FIG. 8 is a perspective front and side view of the controller of FIG. 1, shown with the detachable cradle inserted between the right and left side panels.

FIG. 8 is a perspective front and side view of the controller 1 of FIG. 1, shown with the detachable cradle 20 inserted between the right and left side panels 3, 4. As illustrated, the detachable cradle 20 supporting a smart device 30 is inserted between the right side panel 3 and the left side panel 4 so that the smart device 30 leans against the raised wall 24 of the detachable cradle 20.

Figure 9:
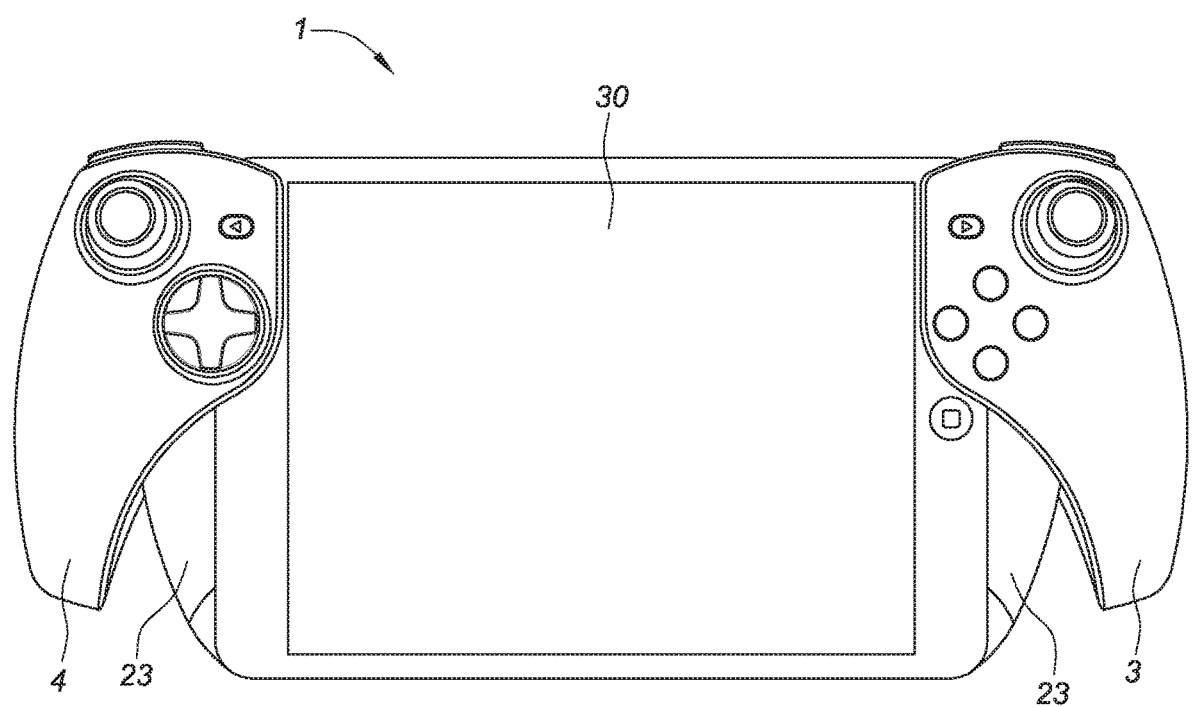
FIG. 9 is a perspective view of the top of the controller of FIG. 1, shown with the detachable cradle supporting a smart device inserted between the right and left side panels.

FIG. 9 is a perspective view of the top of the controller 1 of FIG. 1, shown with the detachable cradle 20 supporting a smart device 30 inserted between the right and left side panels 3, 4. As illustrates, the detachable cradle 20 includes support components 23 on the ride and left sides of the detachable cradle.

Figure 10:
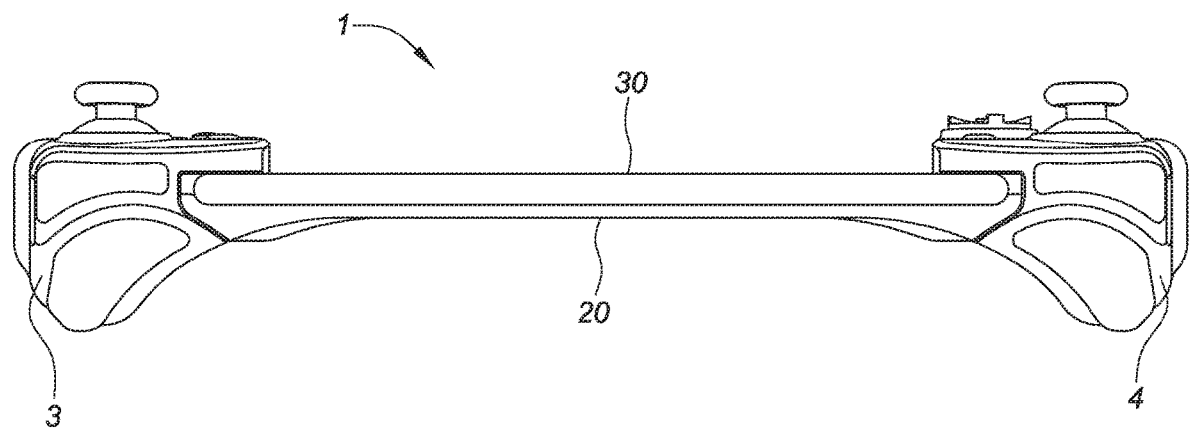
FIG. 10 is a perspective view of the back of the controller of FIG. 1, shown with the detachable cradle inserted between the right and left side panels.

FIG. 10 is a perspective view of the back of the controller 1 of FIG. 1, shown with the detachable cradle 20 inserted between the right and left side panels 3, 4.

Figure 11:
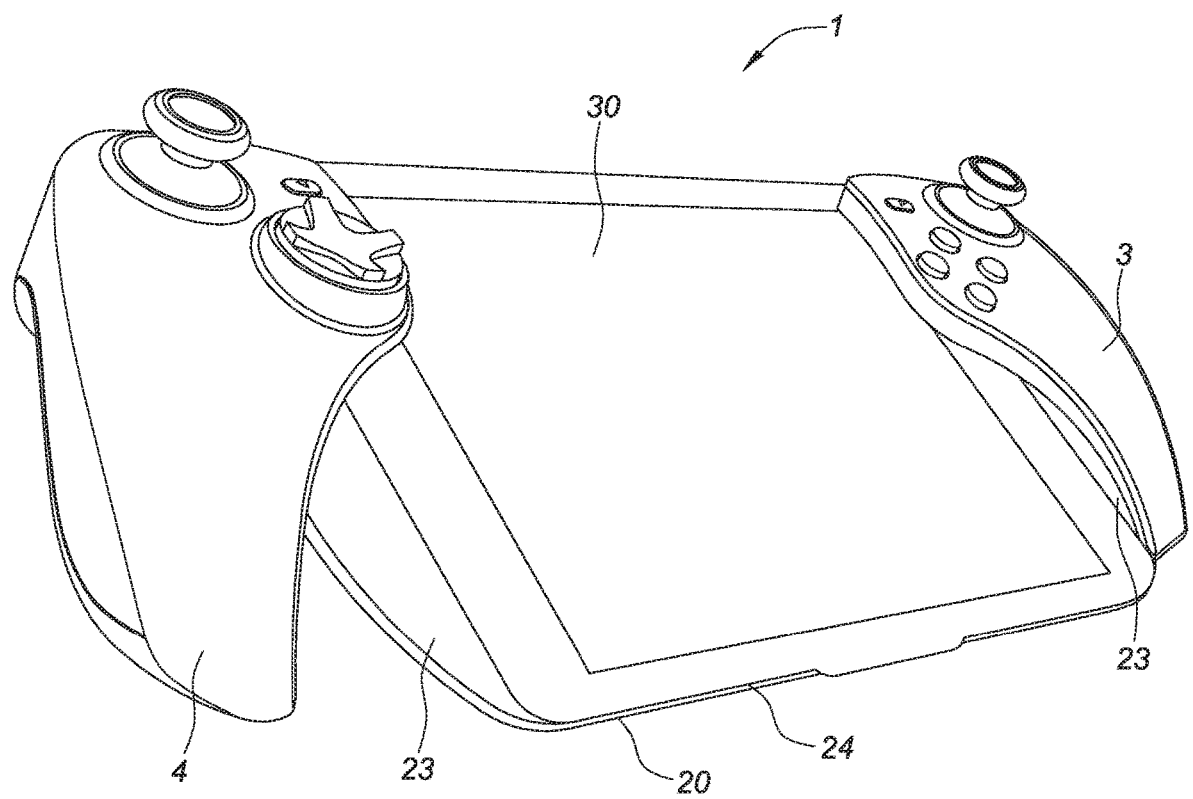
FIG. 11 is a perspective view of another illustrative example of the controller with an undetachable cradle placed between the right and left side panels in accordance with the present teachings.

FIG. 11 is a perspective view of another illustrative example of the controller 1 with an undetachable cradle 20 placed between the right and left side panels 3, 4 in accordance with the present teachings. As illustrated, the undetachable cradle 20 supports a smart device 30 placed upon the undetachable cradle 20. The undetachable cradle 20 includes support components 23 on the right and left side of the undetachable cradle and the raised wall 24 which the smart device 30 leans against.

Figure 12:
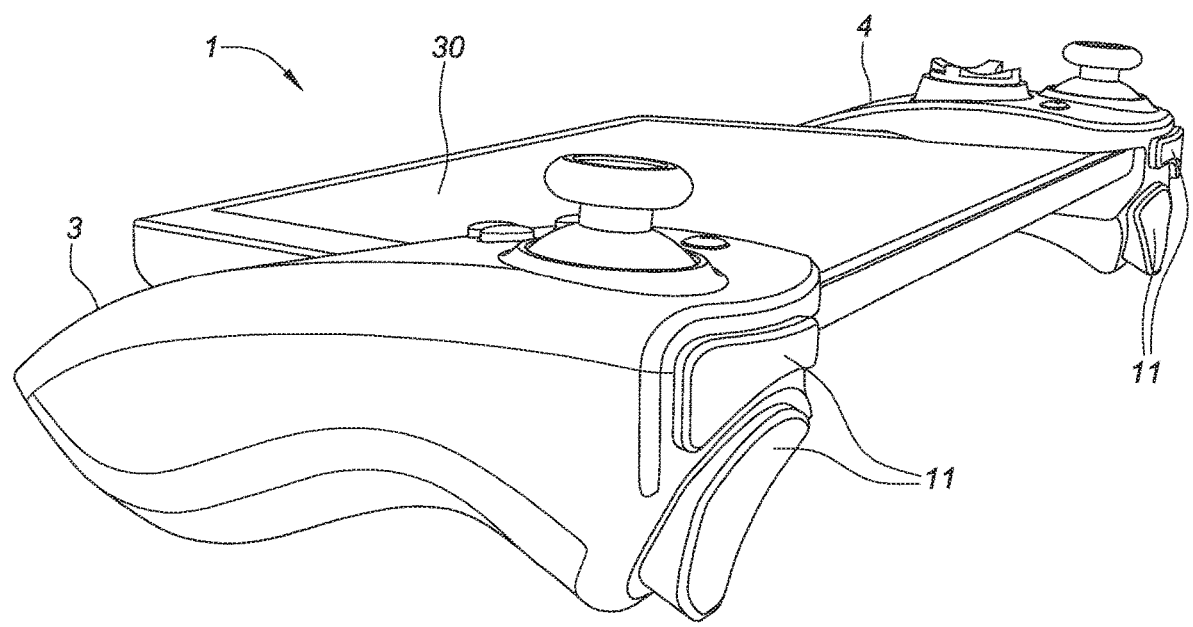
FIG. 12 is a side and back view of the controller as shown in FIG. 11, showing the undetachable cradle supporting a smart device, the shoulder buttons and the ergonomic shape of the side panels.

FIG. 12 is a side and back view of the controller 1 as shown in FIG. 11, showing the undetachable cradle 20 supporting a smart device 30, the shoulder buttons 11 and the ergonomic shape of the side panels 3, 4.

Figure 13:
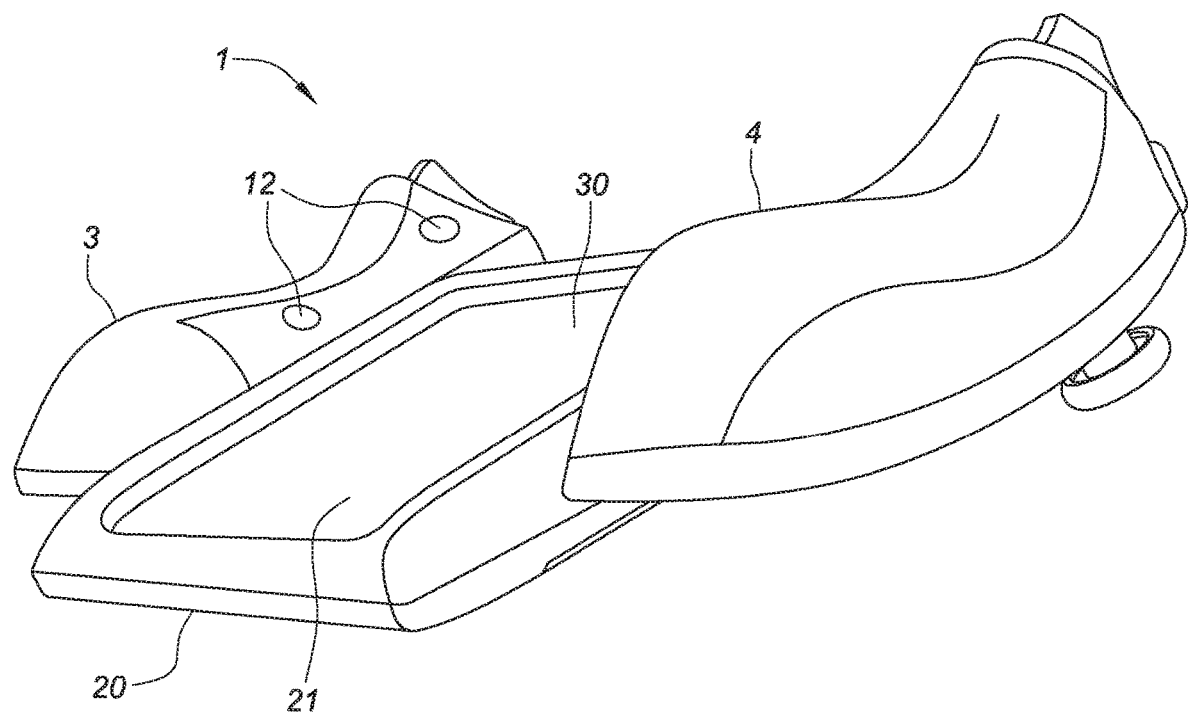
FIG. 13 is a perspective view of the bottom of the controller as shown in FIG. 11, showing the undetachable cradle supporting a smart device attached to the right and left side panels.

FIG. 13 is a perspective view of the bottom of the controller 1 as shown in FIG. 11, showing the undetachable cradle 20 supporting a smart device 30 attached to the right and left side panels 3, 4. As illustrated, the undetachable cradle 20 includes a central opening 21 through which the smart device 30 can be seen. The undetachable cradle is affixed to the right side panel left side panels 3, 4 with fasteners 12.

Figure 14:
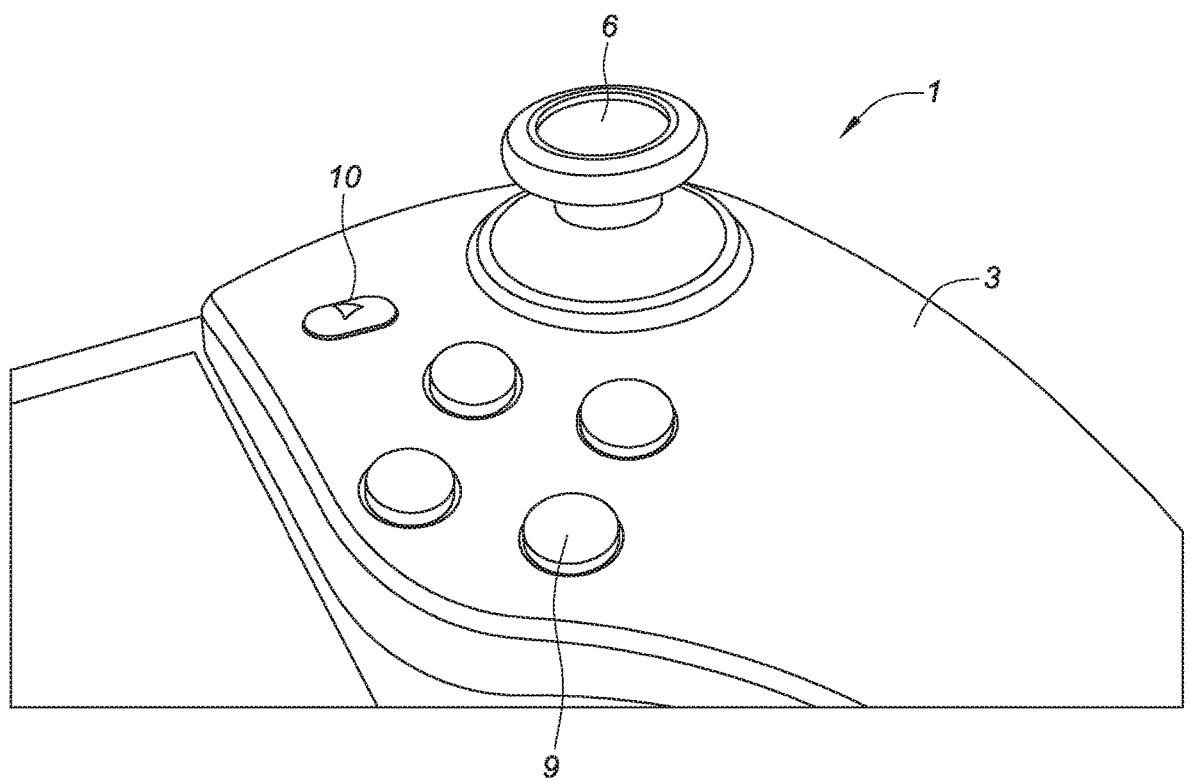
FIG. 14 is a perspective front view of the controller as shown in FIG. 11, illustrating controls on the right side panel.

FIG. 14 is a perspective front view of the controller 1 as shown in FIG. 11, illustrating controls on the right side panel 3. The controls depicted are the right analog stick 6, an arrow button 10, and a set of face action buttons 9.

Figure 15:
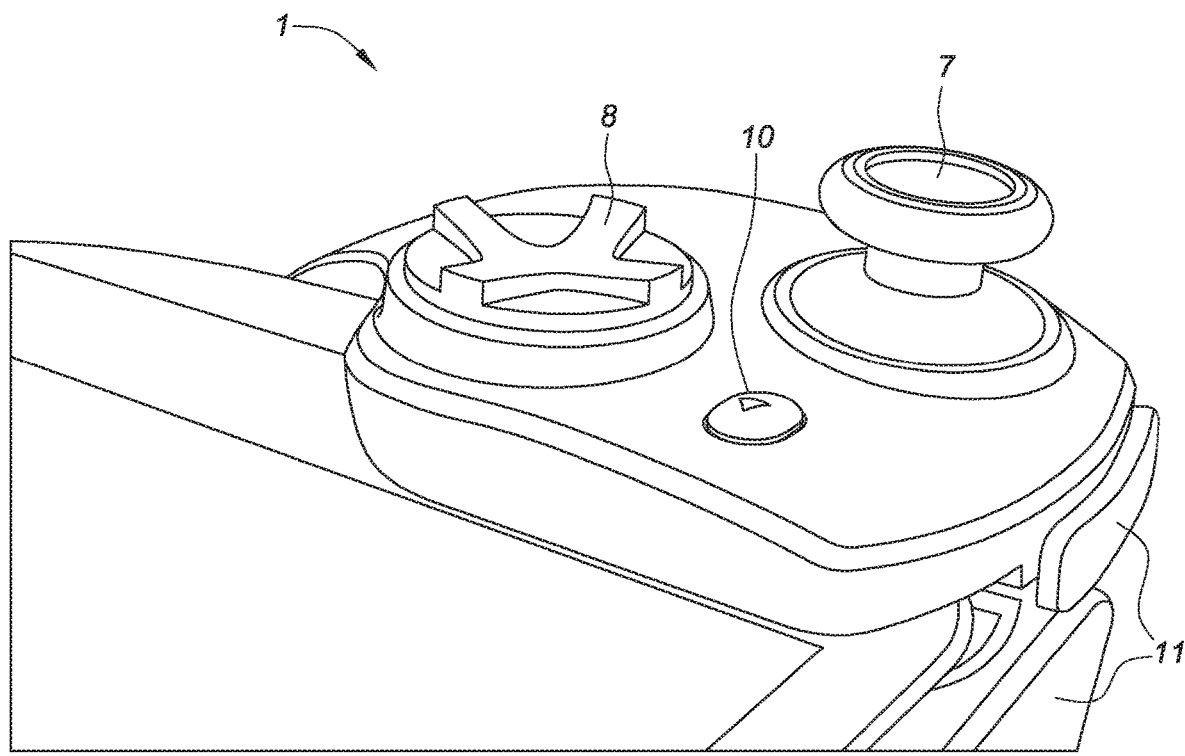
FIG. 15 a perspective back view of the controller as shown in FIG. 11, illustrating controls on the left side panel.

FIG. 15 a perspective back view of the controller 1 as shown in FIG. 11, illustrating controls on the left side panel 4. The controls depicted are the left analog stick 7, an arrow button 10, and the directional pad 8. As illustrated, the left side panel 4 also includes two shoulder buttons 11.

Figure 16:
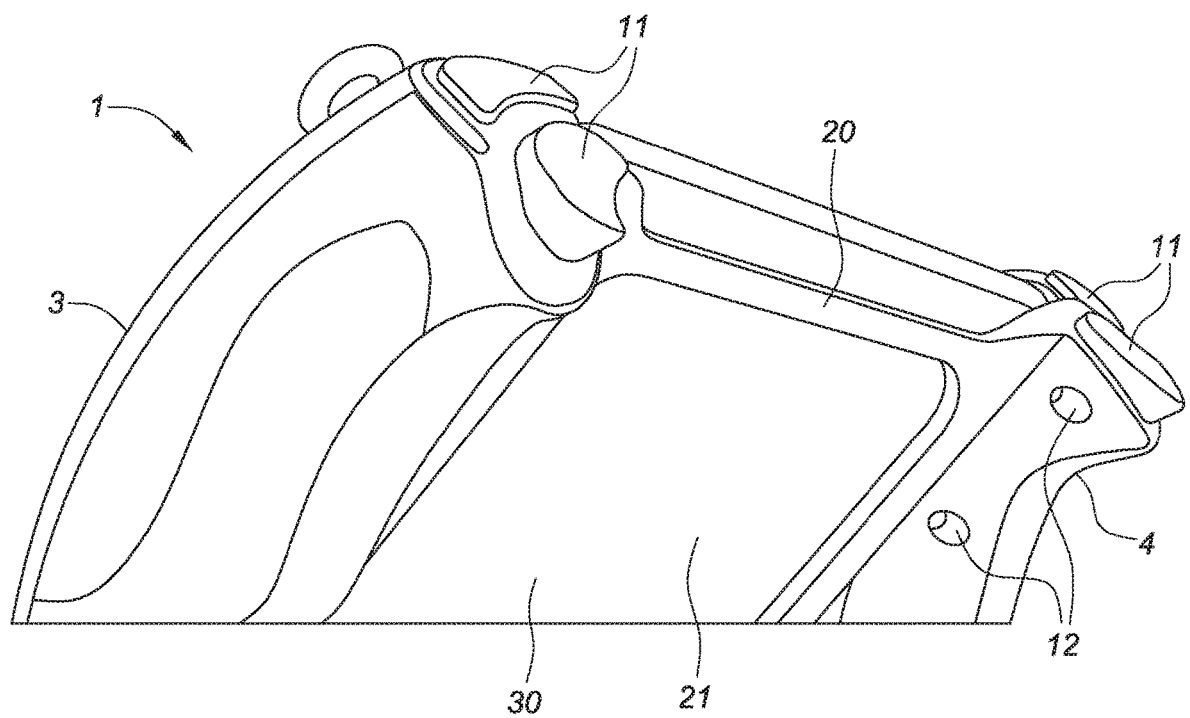
FIG. 16 is a perspective view of the bottom of the controller of FIG. 11, shown with the shoulder buttons and the undetachable cradle supporting a smart device.

FIG. 16 is a perspective view of the bottom of the controller 1 of FIG. 11, shown with the shoulder buttons 11 and the undetachable cradle 20 supporting a smart device 30. As illustrated, the undetachable cradle 20 includes a central opening 21 through which the smart device 30 can be seen. The back sides of the right and left side panels 3, 4 include shoulder buttons 11. The right and left side panels 3, 4 are attached to the undetachable cradle 20 with fasteners 12.

Figure 17:
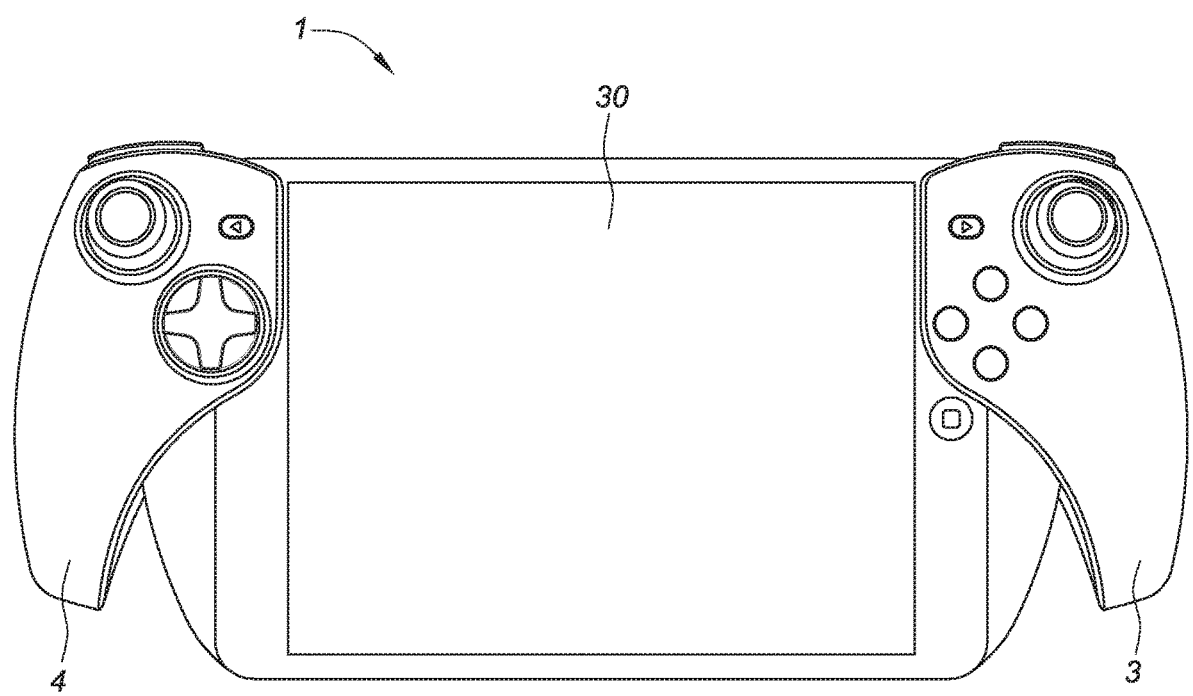
FIG. 17 is a perspective front view of the controller of FIG. 11, shown with the undetachable cradle attached to the right and left side panels, supporting a smart device.

FIG. 17 is a perspective front view of the controller 1 of FIG. 11, shown with the undetachable cradle 20 attached to the right and left side panels 3, 4, supporting a smart device 30.

Figure 18:
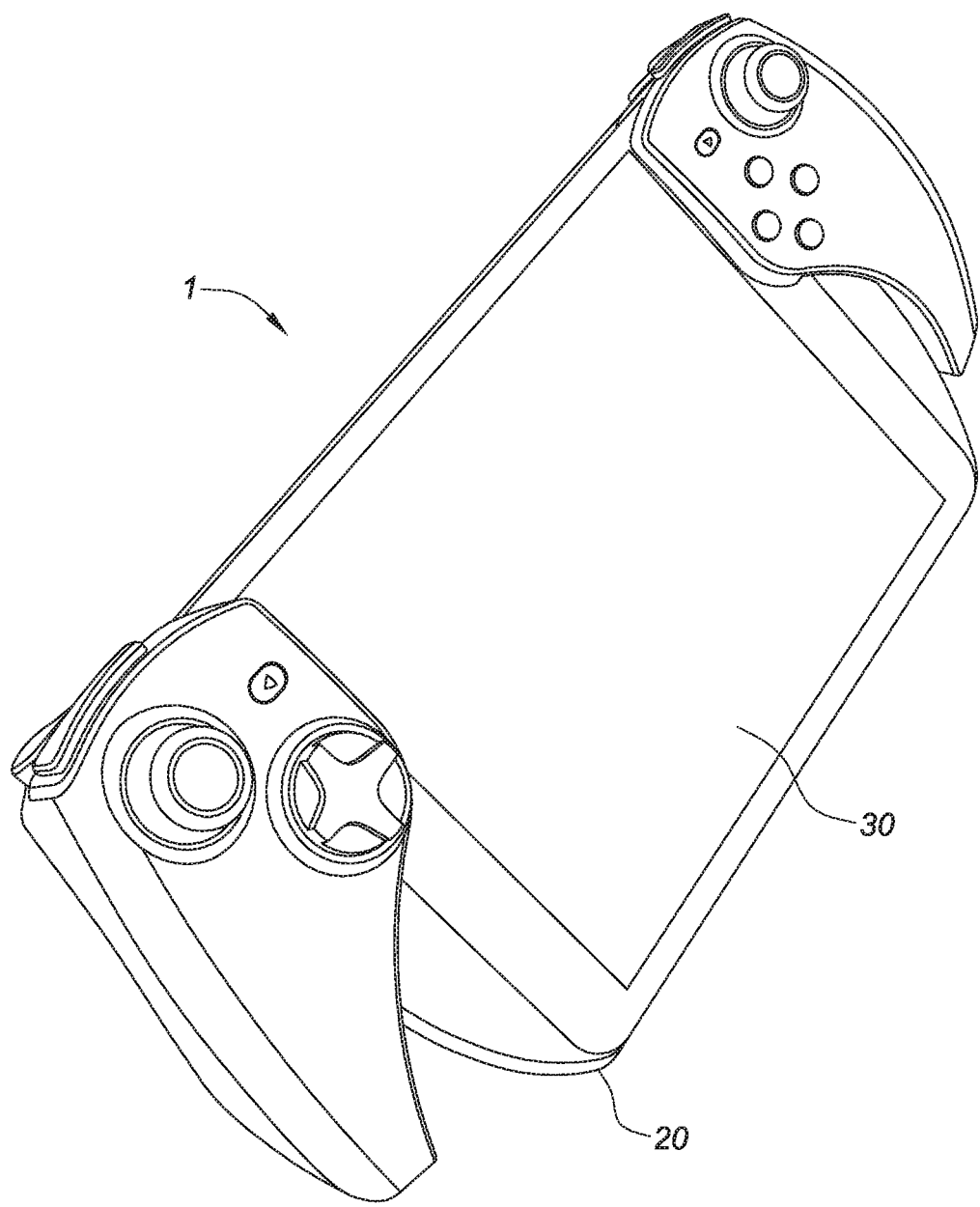
FIG. 18 is a perspective side and top view of the controller of FIG. 11, shown with the undetachable cradle supporting a smart device.

FIG. 18 is a perspective side and top view of the controller 1 of FIG. 11, shown with the undetachable cradle 20 supporting a smart device 30.

Figure 19:
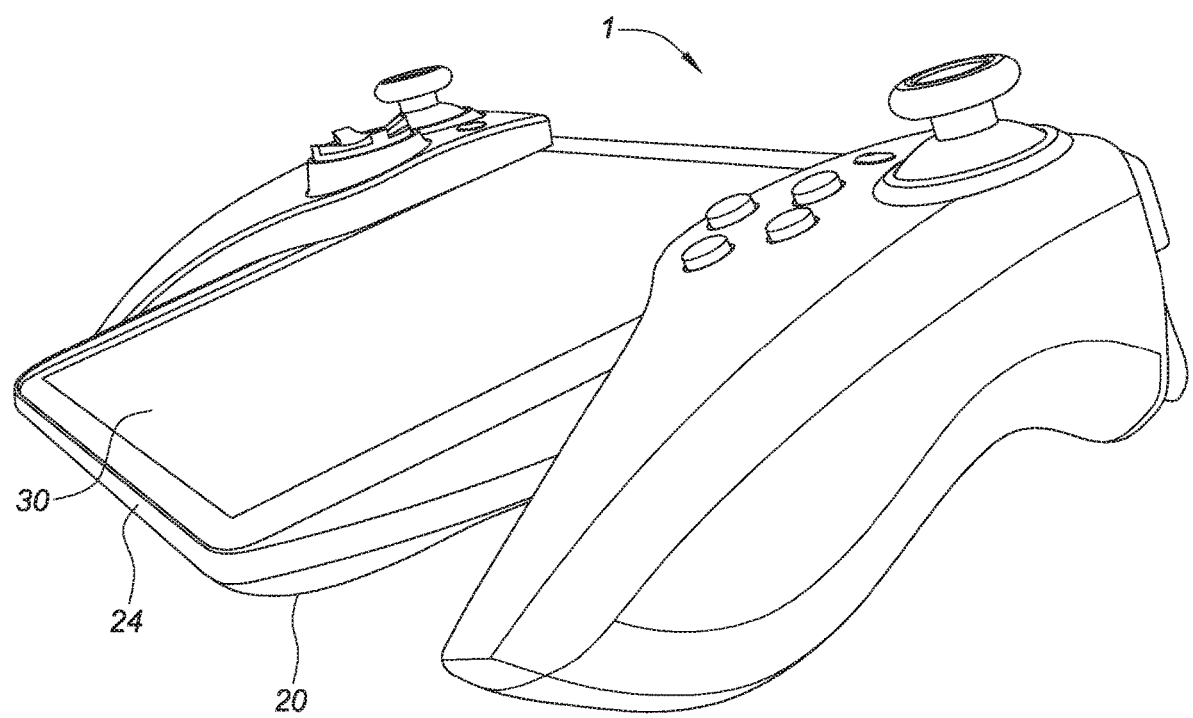
FIG. 19 is a perspective side view of the controller of FIG. 11, shown with the undetachable cradle supporting a smart device.

FIG. 19 is a perspective side view of the controller 1 of FIG. 11, shown with the undetachable cradle 20 supporting a smart device 30. As illustrated, the undetachable cradle 20 includes a raised wall 24 which the smart device 30 leans against once inserted into the undetachable cradle 20.

Figure 20:
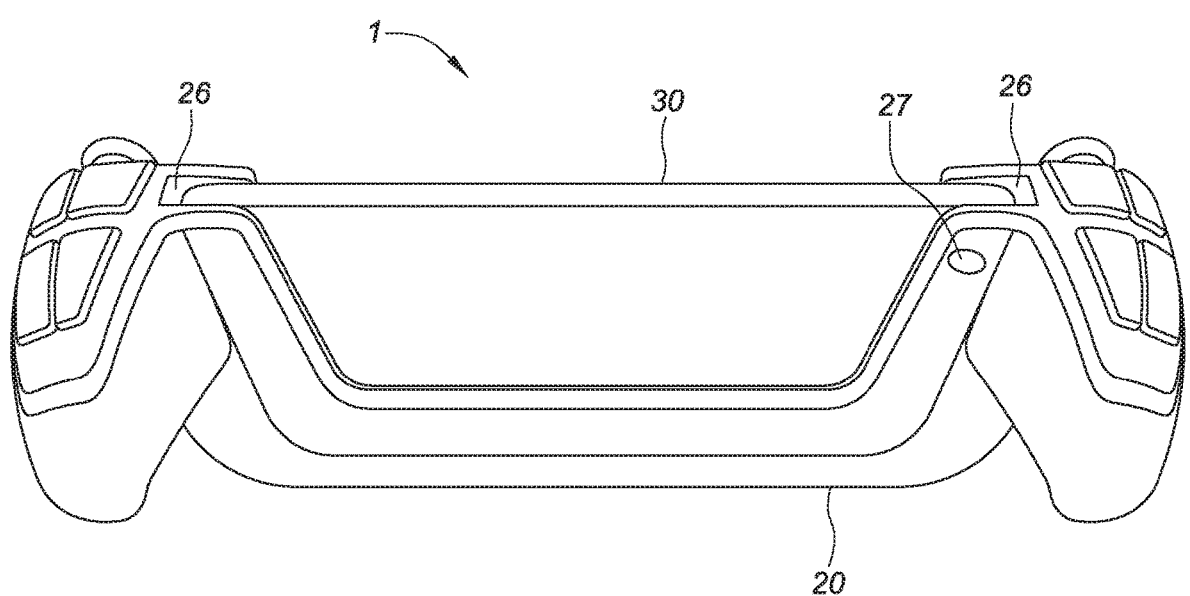
FIG. 20 is a perspective back view of another embodiment of a controller with a cradle supporting a smart device on three sides, leaving one side of the smart device free of support.

FIG. 20 is a perspective back view of another embodiment of a controller 1 with a cradle 20 supporting a smart device 30 on three sides, leaving one side of the smart device 30 free of support. As illustrated, the cradle 20 has two slots 26 which the smart device 30 slides into. The cradle 20 also features a device opening 27 allowing a user to utilize the smart device's camera lens.

Although the controller described herein includes illustrations relating to its use with an e-reader/tablet style device such as the iPhone®, iPad®, and iPad Mini (available from Apple, Inc., Cupertino, Calif.), it is understood that the controller can be formed in alternative sizes, shapes and configurations to serve as a controller having the described features and utilities for other electronic devices such as smart phones, MP3 players, computing devices, and other popular electronic devices.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

What is claimed is:

1. An electronic smart device system comprising:
a right side panel having at least one gaming control;
a left side panel having at least gaming control;
a detachable chassis housing configured on a right side of the detachable chassis housing to attach or detach the right side panel and further configured on a left side of the detachable chassis housing to attach or detach the left side panel; and
a detachable cradle housing;
wherein the detachable cradle housing is configured on a right side of the detachable cradle housing to attach or detach the right side panel, configured on a left side of the detachable cradle housing to attach or detach the left side panel, and further configured to provide a depression to securely attach a smart device, wherein the smart device comprises an electronic component containing at least a processor, memory storage, and an electronic touch-screen;
wherein the right side panel and the left side panel can receive the detachable chassis housing in a first configuration, wherein the first configuration forms a non-flexible gaming controller that does not physically incorporate the smart device and is not capable of physically incorporating any smart device;

wherein when the detachable chassis housing is removed from the right side panel and the left side panel, the right side panel and the left side panel can receive the detachable cradle housing in a second configuration;

wherein the right side panel and the left side panel are not configured to attach to each other to form a gaming controller;

wherein at least one of the game controls is configured to control an application on the smart device;

wherein the detachable cradle housing has support wings on each side that can slide into wing slots of the right side panel and wing slots of left side panel; and wherein the detachable cradle housing serves as a housing for the smart device and wherein the detachable cradle housing has a connection part on each side that fits into a connection slot of the right side panel or a connection slot on the left side panel for securing the attachment of either the right side panel or the left side panel to the cradle.

2. The system of claim 1, wherein the detachable cradle housing further comprises one or more chassis housing openings configured to allow a user to utilize a display, a power button, a reset button, a volume button, a microphone, a speaker, a screen brightness adjuster, a camera, or a charging port of the smart device.

3. The system of claim 2, further comprising at least one or more wireless components in the right side panel or the left side panel for exchanging data with the smart device.

* * * * *